US00RE41871E

(19) United States
(12) Reissued Patent
Capowski et al.

(10) Patent Number: US RE41,871 E
(45) Date of Reissued Patent: Oct. 26, 2010

(54) ALARM SYSTEM WITH INDIVIDUAL ALARM INDICATOR TESTING

(75) Inventors: Anthony J. Capowski, Westford, MA (US); Michael A. Furtado, Shrewsbury, MA (US); Paul H. Maier, Jr., Athol, MA (US)

(73) Assignee: ADT Services AG, Schaffhausen (CH)

(21) Appl. No.: 10/703,027

(22) Filed: Nov. 6, 2003

Related U.S. Patent Documents

Reissue of:
(64) Patent No.: 6,313,744
Issued: Nov. 6, 2001
Appl. No.: 09/047,894
Filed: Mar. 25, 1998

(51) Int. Cl.
*G08B 23/00* (2006.01)

(52) U.S. Cl. ..... 340/514; 340/517; 340/506; 340/538; 340/533; 340/539.1; 340/535

(58) Field of Classification Search ..... 340/514, 340/517, 506, 538, 533, 535, 539.1
See application file for complete search history.

(56) References Cited

U.S. PATENT DOCUMENTS 3,623,049 A 11/1971 Hill
3,710,373 A * 1/1973 Watanabe et al. ..... 340/870.02
3,955,183 A 5/1976 McBrian
4,054,869 A 10/1977 Smith et al.
4,064,507 A 12/1977 Schmitz
4,065,767 A * 12/1977 Neuhof et al. ..... 340/384.4
4,100,543 A 7/1978 Stockdale et al.
4,154,189 A 5/1979 Gallagher et al.
4,225,856 A 9/1980 Learn
4,226,155 A 10/1980 Ferdinand
4,389,638 A 6/1983 Gontowski, Jr.
4,394,655 A 7/1983 Wynne et al.
4,412,211 A 10/1983 Lautzenheiser et al.
4,470,047 A 9/1984 Vogt et al.
4,507,652 A 3/1985 Vogt et al.
4,518,952 A 5/1985 Tanaka et al.
4,558,305 A 12/1985 Black et al.
4,571,586 A * 2/1986 Right ..... 340/517
4,665,383 A 5/1987 Desjardins
4,698,619 A 10/1987 Loeb
4,785,280 A 11/1988 Fubini et al.
4,796,025 A 1/1989 Farley et al.
4,816,809 A 3/1989 Kim (Continued)

*Primary Examiner*—Daryl Pope

(57) ABSTRACT

A building alarm system includes addressable notification appliances connected to a system controller, with each notification appliance having a status indicator and an alarm indicator. The status indicator, such as an LED, provides for system test modes that avoid disruption of building occupants. To test the alarm system, the system controller selects which notification appliances to operate in response to a test alarm input and communicates to each selected appliance an instruction to operate its associated status indicator without operating its associated audible or flashing visible alarm indicators. In a troubleshooting mode, the system controller polls each of the notification appliances and receives an answer in response to the poll from any of the appliances. The controller operates the LED indicators of those appliances which answer the poll. This allows a technician to locate for troubleshooting only those appliances having an nonoperating LED indicator, perhaps due to a failure to respond to its poll. According to another aspect, each addressable notification appliances includes a microprocessor and a manually-activated switch. The microprocessor is programmed to transmit a first message in response to an activation of the switch. The system controller receives the first message from the activated appliance and in response transmits a second message instructing the appliance to operate its associated alarm indicator for a test time interval.

32 Claims, 5 Drawing Sheets

U.S. PATENT DOCUMENTS

| | | | | |
|---|---|---|---|---|
| 4,954,809 | A | | 9/1990 | Right et al. |
| 4,991,123 | A | | 2/1991 | Casamassima |
| 5,121,101 | A | | 6/1992 | Jakubowski et al. |
| 5,155,468 | A | | 10/1992 | Stanley et al. |
| 5,173,683 | A | | 12/1992 | Brighenti et al. |
| 5,293,155 | A | | 3/1994 | Nicol et al. |
| 5,379,023 | A | | 1/1995 | Dalton |
| 5,400,009 | A | | 3/1995 | Kosich et al. |
| 5,400,246 | A | | 3/1995 | Wilson et al. |
| 5,406,254 | A | | 4/1995 | Le Nay et al. |
| 5,525,962 | A | | 6/1996 | Tice |
| 5,534,845 | A | | 7/1996 | Issa et al. |
| 5,559,492 | A | | 9/1996 | Stewart et al. |
| 5,576,685 | A | | 11/1996 | Saito |
| 5,608,375 | A | | 3/1997 | Kosich |
| 5,663,714 | A | | 9/1997 | Fray |
| 5,675,312 | A | | 10/1997 | Burnett |
| 5,705,979 | A | | 1/1998 | Fierro et al. |
| 5,751,210 | A | | 5/1998 | Kosich |
| 5,887,067 | A | * | 3/1999 | Costa et al. ..... 381/81 |
| 6,281,789 | B1 | | 8/2001 | Furtado et al. |
| 6,472,980 | B1 | | 10/2002 | Jen et al. |
| 6,822,555 | B2 | * | 11/2004 | Mansfield et al. ..... 340/538.11 |
| 2002/0135491 | A1 | | 9/2002 | Maier, Jr. |

* cited by examiner

ALARM SYSTEM WITH INDIVIDUAL ALARM INDICATOR TESTING

Matter enclosed in heavy brackets [ ] appears in the original patent but forms no part of this reissue specification; matter printed in italics indicates the additions made by reissue.

BACKGROUND OF THE INVENTION

Typical building fire alarm systems include a number of fire detectors positioned throughout a building. Signals from those detectors are monitored by a system controller which, upon sensing an alarm condition, sounds audible alarms throughout the building. Flashing light strobes may also be positioned throughout the building to provide a visual alarm indication. A number of audible alarms and strobes, generally referred to as notification appliances, are typically connected across common power lines on a notification circuit. A first polarity DC voltage may be applied across the notification circuit in a supervisory mode of operation. In the supervisory mode, rectifiers at the notification appliances are reverse biased so that the alarms are not energized, but current flows through the power lines of the notification circuit to an end of line resistor and back so that the condition of those lines can be monitored. With an alarm condition, the polarity of the voltage applied across the power lines is reversed to energize all notification appliances on the notification circuit.

An alternate method of supervising audible alarms and strobes is to use addressable appliances as disclosed in U.S. Pat. Nos. 4,796,025 (Farley et al.); 5,155,468 (Stanley et al.); and 5,173,683 (Brighenti et al.). Each addressable appliance bas an individual address and is polled by the system controller to determine if it is present. When an appliance receives its associated address, its response to the poll indicates that the communication path between the appliance and the system controller is operational.

During installation of a building fire alarm system, the system controller is programmed to associate each fire detector input signal with one or more notification appliance circuits (in the case of non-addressable appliances) or individual notification appliances (in the case of addressable notification appliances). In a conventional system installation, programming can be verified by initiating an alarm input (e.g., smoke detector, pull station) to cause an alarm notification through the associated audible and visible notification appliances. A technician can then verify the programming by walking through the building and checking that the appropriate audible and visible notification appliances have been operated. Once the conventional building fire alarm system becomes operational, testing of individual notification appliances is accomplished by causing all of the appliances on a notification circuit to operate, followed again by a technician walking through the building to check that all of the appliances are functioning.

SUMMARY OF THE INVENTION

The conventional methods of verifying system installation and troubleshooting notification appliances can be very disruptive, especially in buildings such as hospitals which do not typically have an unoccupied period during which testing can be performed.

In accordance with the present invention, notification appliances connected to a system controller are provided, with each appliance having an alarm indicator such as an audible alarm or strobe, and a status indicator, such as an LED. The status indicator provides for system test modes that are not disruptive to building occupants. Accordingly, to test the programming of an alarm system, the system controller selects which notification appliances to operate in response to a test alarm input which is specific to one or more alarm condition detectors and communicates to each selected appliance an instruction to operate its associated status indicator without operating its associated alarm indicator. A technician can then check that the correct appliances have been operated, thus verifying the programming without disturbing the occupants of the building by activating the appliance. For notification appliances having both an audible alarm and a strobe, the status indicator can be operated at different rates to distinguish whether the audible alarm, strobe, or both would normally have been energized.

In a troubleshooting mode where there has been a supervision failure, the system controller selects to operate the status indicator of those notification appliances which respond to polling. This allows a technician to locate for troubleshooting purposes only those appliances having a nonoperating status indicator.

According to another aspect of the invention, an alarm system includes plural notification appliances that each have an alarm indicator, a microprocessor and a locally-activated switch. The microprocessor is programmed to transmit a first message in response to a manual activation of the switch. A system controller connected to the notification appliances receives the first message from the activated appliance and in response transmits a second message instructing the appliance to operate its associated alarm indicator for a test time interval. In a preferred embodiment, the locally-activated switch is a magnetic-field sensitive switch. In an alternate embodiment, the switch comprises an infrared sensor and switch circuitry. Each notification appliance further includes a status indicator which the microprocessor is programmed to operate in response to the switch activation for a second test time interval.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
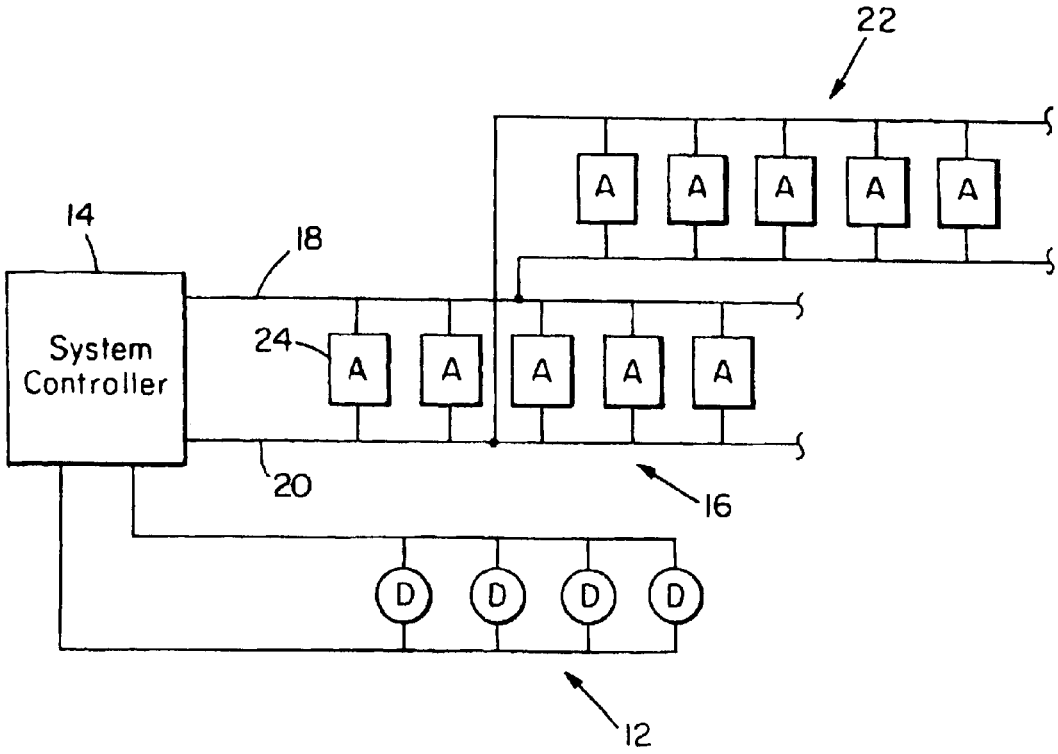
FIG. 1 illustrates an alarm system embodying the present invention.

A system embodying the present invention is illustrated in FIG. 1. As in a conventional alarm system, the system includes one or more detector networks 12 having individual alarm condition detectors D which are monitored by a system controller 14. When an alarm condition is sensed, the system controller signals the alarm to the appropriate devices through at least one network 16 of addressable alarm notification appliances A. Because the individual devices are addressable, supervision occurs by polling each device so that a network 16, also referred to as a notification appliance circuit (NAC), can include one or more single-ended stub circuits 22. As shown, all of the notification appliances are coupled across a pair of power lines 18 and 20 that also carry communications.

Figure 2:
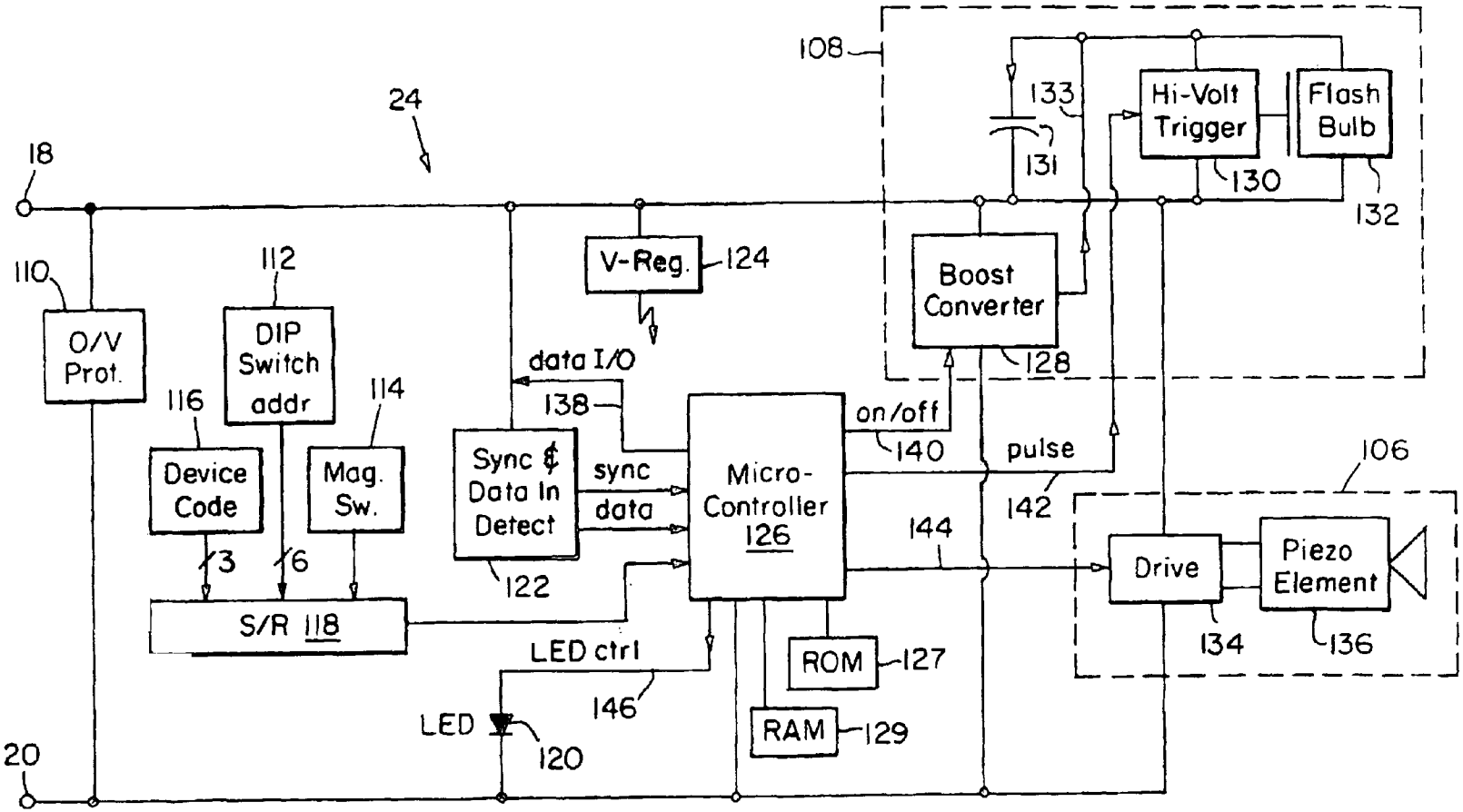
FIG. 2 is an electrical schematic block diagram of an audible/visible alarm notification appliance in the system of FIG. 1.

A preferred combination audible/visible notification appliance 24 is presented in FIG. 2. Embodiments of individual audible and visible appliances are subsets of this schematic. Lines 18, 20 are coupled across over-voltage protector 110 to protect the appliance 24 against power surges and lightning strikes. A microprocessor 126 controls and operates audible indicator circuit 106, flashing visible indicator circuit 108 and status indicator 120. A shift register 118 provides the microprocessor 126 with serial access to six address bits set in DIP switch 112, three device code bits set in register 116, and a switch status bit set by switch 114. Data-in and sync state inputs are provided to the microprocessor 126 through sync/data detector 122. The microprocessor 126 includes data output line 138, strobe power converter control line 140, strobe flash trigger 142, horn control line 144, and LED control line 146. The microprocessor 126 also includes random access memory (RAM) 129 and read only memory (ROM) 127. In an alternate embodiment, the functions of microprocessor 126, as disclosed hereinbelow are performed by an application specific integrated circuit (ASIC).

Figure 2A:
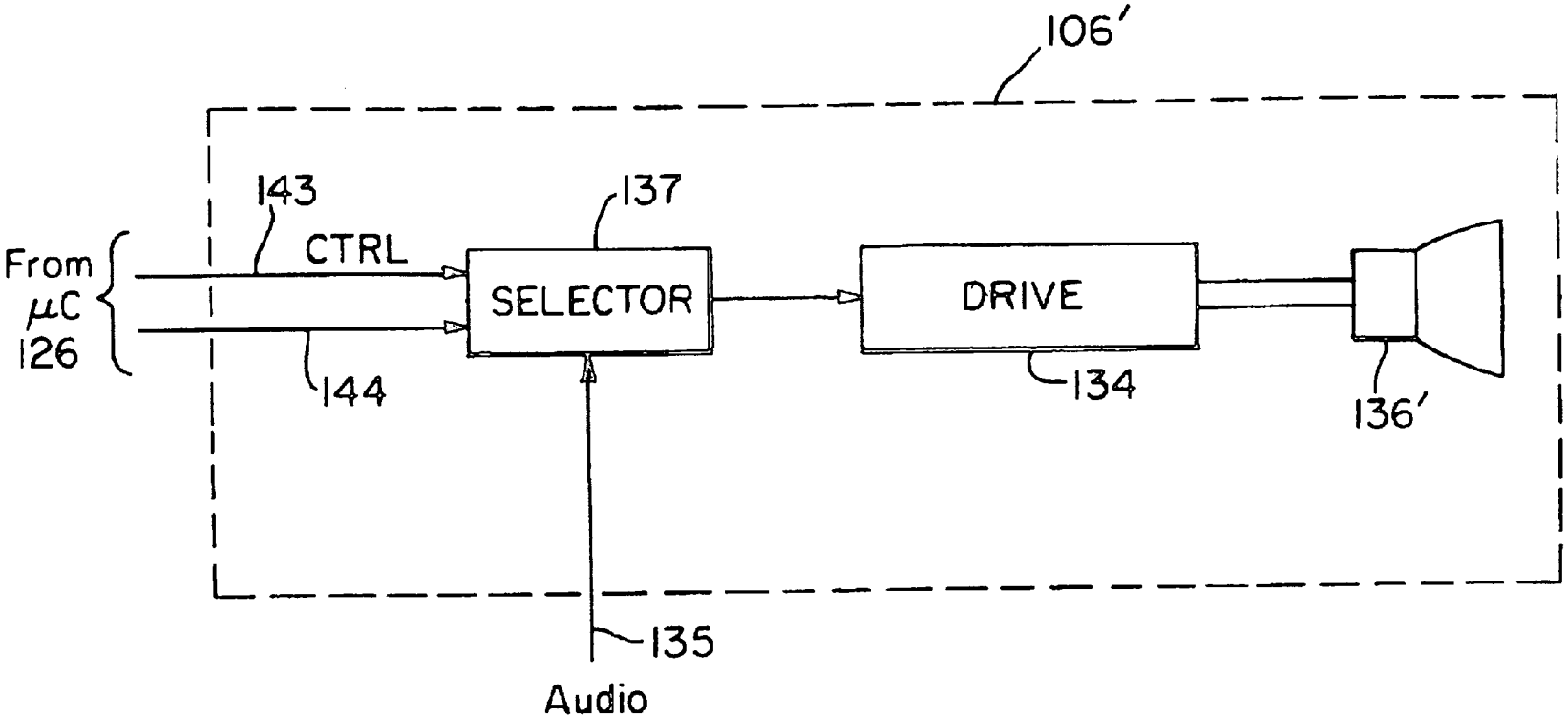
FIG. 2A is a schematic block diagram of an alternate embodiment of an audible indicator circuit for the appliance of FIG. 2.

The audible indicator circuit 106 includes a drive circuit 134 that drives an audio transducer 136. In the embodiment of FIG. 2, the audio transducer is a conventional piezo element. The microprocessor 126 operates the audible indicator circuit 106 by sweeping the drive circuit 134 with a nominal 3 kHz square wave signal on horn control line 144. In an alternate embodiment (FIG. 2A), the audible indicator circuit 106 can instead include a speaker 136' as the audio transducer through which the microprocessor 126 plays prerecorded announcements retrieved from ROM 127. In the alternate embodiment of appliance 24, an audible indicator circuit 106' includes a selector 137 which selects between the 3 kHz square wave signal on line 144 and an audio signal 135 under control of the microprocessor 126 on control line 143. The audio signal 135 is provided to the appliance 24 from the system controller 14 either on a separate loop or superimposed on power/communication lines 18, 20.

The flashing visible indicator circuit 108 can be easily constructed from the teachings in U.S. Pat. No. 5,559,492 (Stewart et al.), which is incorporated herein by reference in its entirety. The visible indicator circuit 108 includes a boost converter 128, capacitor 131, high-voltage trigger 130 and flash bulb 132. The boost converter 128 is a charging circuit powered by the power lines 18, 20 that applies a series of current pulses to capacitor 131 on line 133 to charge the capacitor. The high-voltage trigger 130 is a firing circuit that causes the capacitor 131 to discharge through the flash bulb 132. To avoid overcharging of the capacitor 131 as the flash bulb waits for a firing signal, the microprocessor 126 disables the boost converter 128 through control line 140 when the capacitor reaches a firing voltage level. In the alarm system disclosed in Stewart et al., the firing circuit responds to a change in voltage across the power lines to trigger the discharge. In the preferred embodiment of the notification appliance 24 of the present invention, the microprocessor triggers discharge through strobe flash trigger line 142.

The status indicator 120 in the preferred embodiment is an LED that is controlled by the microprocessor 126 through control line 146. While an unobtrusive LED indicator is preferred, it should be understood that in other embodiments the status indicator can include audible indicators such as a horn or speaker or even the circuit 106 operated at a much lower volume.

The switch 114 is a manually-activated switch, which is preferably a magnetic-field sensitive switch such as a reed switch. In a typical application, a technician manually passes a magnet across the face of the appliance to activate the reed switch. A single appliance test process using the switch is described further herein.

In an alternate embodiment, the switch 114 comprises an infrared receiver responsive to an activation signal from an infrared transmitter operated by the technician. A detected activation signal sets the switch status bit in shift register 118.

The notification appliances 24 are operated through commands received over the NAC 16 from the system controller 14. At system installation and at predetermined intervals, the appliances monitor the NAC 16 for a timing-training message broadcast from the system controller 14 which causes each appliance to adjust its local timebase to match that of the system controller 14.

The alarm system has two normal modes of operation: SUPERVISORY mode and ALARM mode. In the SUPERVISORY mode, the system controller 14 applies 8 to 9 VDC to the NAC 16 to provide only enough power to support two-way communications between the system controller and the microprocessor 126 of each appliance 24. In the ALARM mode, the system controller 14 applies a nominal 24 VDC to the NAC 16 to supply power to operate the audible and visible indicator circuits of the appliances.

In the preferred embodiment, the system controller 14 communicates digital data to the appliances using a three level voltage signal: sync (less than 3 volts), data 1 (8–9 volts) and data 0 (24 volts). Communication from the notification appliance 24 towards the system controller 14 is effected by the microprocessor 126 on data line 138.

When not performing any functions, the microprocessor is put into a sleep mode to conserve power. The sync level signal is used to wake up the microprocessor 126 from a low power state. The appliance then checks whether a message is addressed to it and, if so, acts on the message. After a predetermined period with no activity, the device goes back to sleep. On reset or power up, the microprocessor 126 reads the DIP switch 112 to obtain the individual appliance address. It then monitors the NAC 16 for polls to this address by the system controller 14. Device code bits hardcoded into register 116 indicate the appliance type, e.g., horn, flashing bulb or both.

An appliance can only act on a command by the system controller to turn on when the appliance is in ALARM MODE. An appliance 24 does not go into ALARM MODE operation until the voltage across the NAC 16 exceeds the minimum ALARM MODE voltage (e.g., 24 VDC) for more than 5 milliseconds, as determined by the microprocessor 126. The appliance 24 turns off when the line voltage is determined to have dropped below the minimum ALARM MODE voltage continuously for greater than 5 milliseconds.

Selected groups of appliances 24 can be controlled by using group designators programmed by the system controller 14. The appliance 24 retains the group designators in RAM 129 of the microprocessor 126. In addition, default group designators include groups designated all audibles, all visibles, and all appliances.

Operation of the notification appliance 24 in accordance with the present invention will now be described with reference to FIGS. 3–5.

Figure 3:
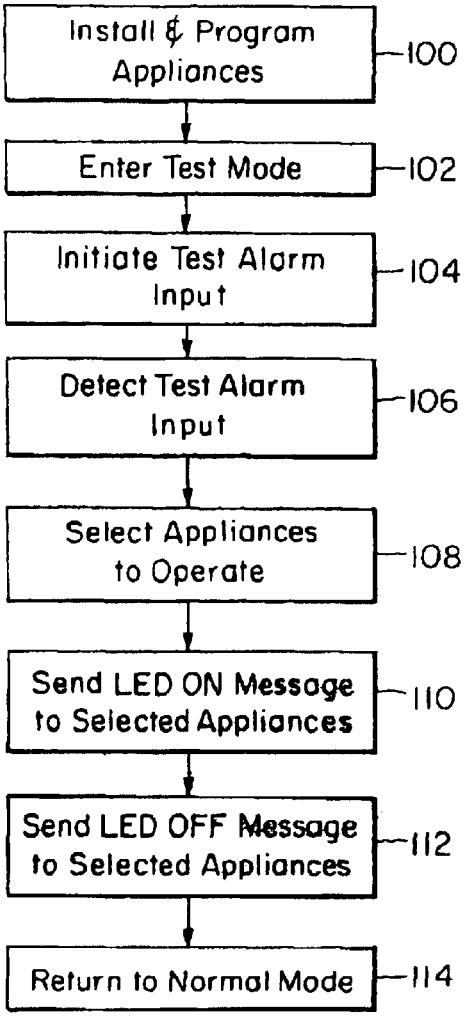
FIG. 3 is a flowchart illustrating an installation verification process of the present invention.

A flowchart illustrating an installation verification process of the present invention is shown in FIG. 3. The notification appliances 24 are installed and the system controller is programmed during a system installation at step 100. To test and verify the programming of the controller, a system test mode is entered at the system controller 14 at step 102 and a technician testing the system initiates an alarm input at a particular alarm condition detector (e.g., smoke detector, pull station) at step 104. At step 106, the alarm input is detected and the system controller selects one or more notification appliances to be operated that correspond to the specific detected alarm input at step 108. In response, the system controller transmits an LED ON message to the selected notification appliances at step 110 to operate status indicator 120. This then allows the technician to conduct a "silent test" of the appliances without actually sounding the audible indicators or flashing the visible indicators. After a test time interval, or on a command by the technician, the system controller transmits an LED OFF message to the selected appliances at step 112 to deactivate status indicator 120 and the alarm system returns to normal operation at step 114.

In the case of a combination audible/visible notification appliance, there are alarm modes in which the flashing visible indicator, audible indicator or both are to be operated. Therefore, it is important when conducting silent testing of the appliances to provide an indication to distinguish such alarm modes. One method is to operate the status indicator 120 at a first rate to indicate that both the audible and visible indicators are being tested, at a second rate to indicate only the visible indicator, and at a third rate to indicate only the audible indicator. The different rates can instead be different on/off duty cycles.

Figure 4:
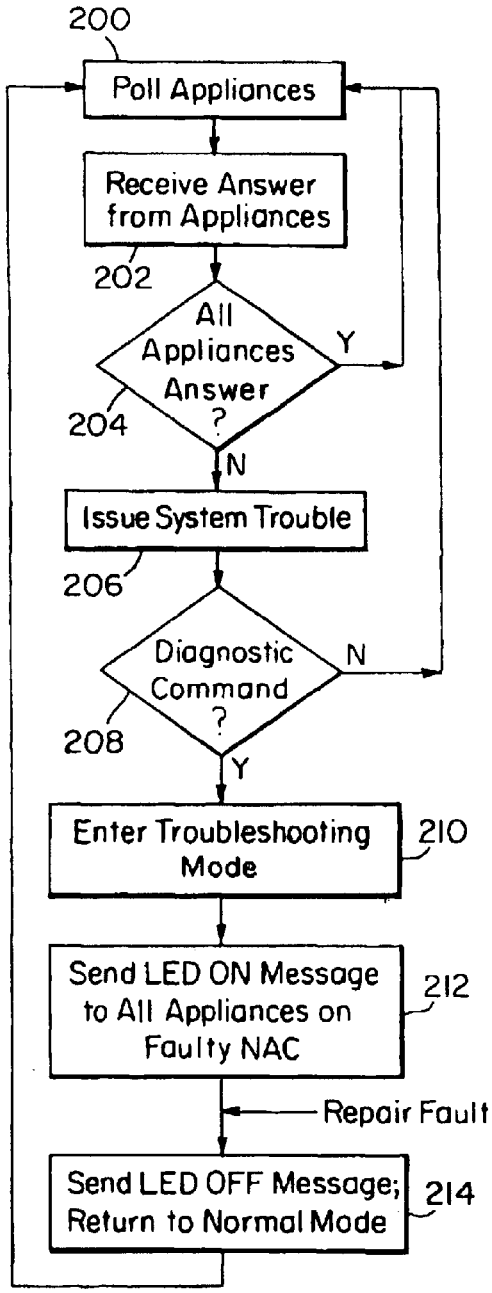
FIG. 4 is a flowchart illustrating a troubleshooting process of the present invention.
Figure 5:
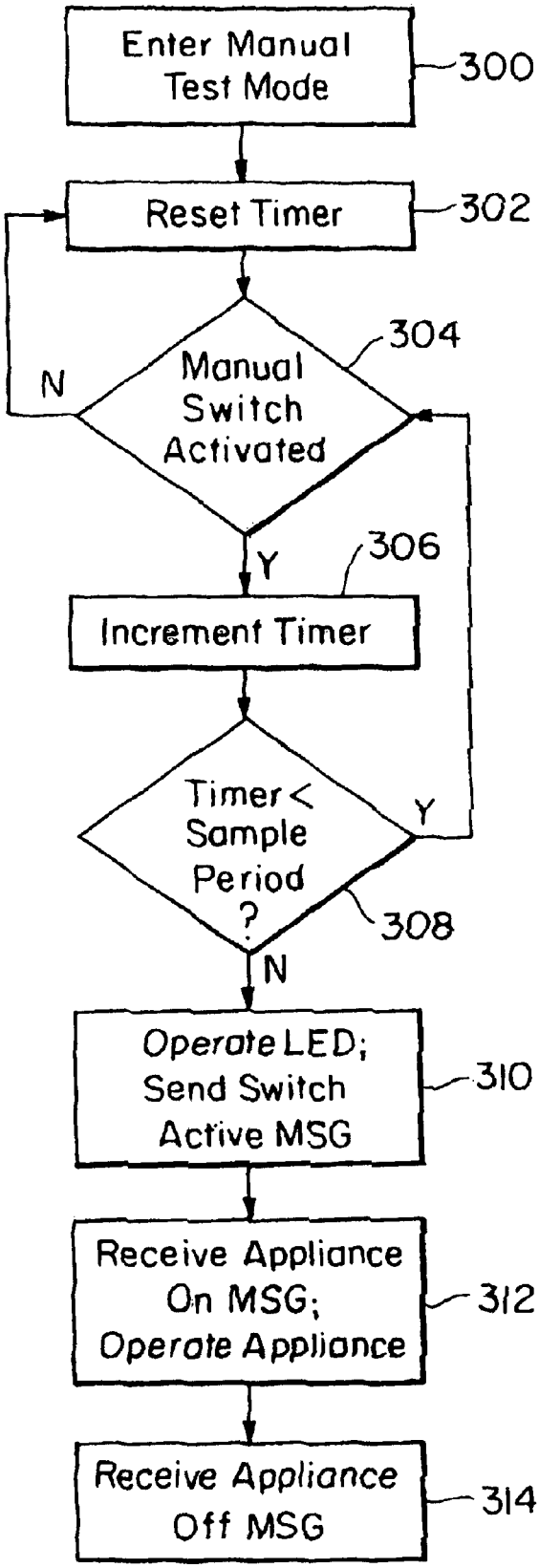
FIG. 5 is a flowchart illustrating an individual appliance testing process of the present invention.

FIG. 4 is a flowchart illustrating a troubleshooting process of the present invention. In the normal mode of operation, the system controller 14 supervises the notification appliance circuit 16 by polling the notification appliances 24 at step 200. The appliances respond to the poll with an answer message transmitted back to the system controller at step 202. If all of the appliances answer the poll at step 204, then the system controller can assume that the appliances are functional and that the wiring has integrity. If an appliance does not answer the poll, a system trouble is issued by the system controller at step 206. At step 208, if the technician selects a diagnostic command, the system controller enters a troubleshooting mode on the specific NAC 16 associated with that particular appliance al 210. The system controller at step 212 transmits an LED ON message to the ALL APPLIANCES group address on the specified NAC 16. All of the appliances then operate their respective LED indicators, except for the faulty appliance, which can be visually identified by the technician. After a test interval long enough to allow proper identification of the faulty appliance or on a command by the technician, the system controller transmits an LED OFF message to the ALL APPLIANCES group address and the system returns to normal alarm operation at step 214.

As noted in the background, conventional testing of a single notification appliance is accomplished by causing all of the appliances on a notification circuit to operate, followed by a technician walking through the building to check that all of the appliances are functioning. This process can be very disruptive in buildings such as hospitals which do not typically have an unoccupied period for such testing. A flowchart illustrating an individual appliance testing process in accordance with the present invention is shown in FIG. 5. At step 300, the system controller 14 sends a broadcast message to the appliances to put them into a manual test mode. In this manual test mode, the status of magnetic switch 114 is monitored by the microprocessor 126 at steps 302, 304, 306, 308. At step 302 a timer is reset and the status of the magnetic switch bit is checked. If a switch activation has occurred, then at step 306 the timer is incremented and at step 308 the timer value is compared with a sample period. If the timer value is less than the sample period, the status checking loops through steps 304, 306, 308 until either a switch activation is not detected at step 304 or the timer value reaches the sample period at step 308. In an alternate embodiment, the status checking loop 304–308 can be modified to only require the switch to be activated for a portion (e.g., 90%) of the sample period to account for "bounce" in the switch.

After the timer value reaches the sample period, meaning that the switch has been activated for the duration of the sample period and therefore a legitimate switch activation has occurred, the microprocessor 126 at step 310 operates the status indicator 120 briefly (e.g., 500 milliseconds) to serve as a local acknowledgment to the technician. The microprocessor then sends a SWITCH ACTIVE message to the system controller. The system controller receives the SWITCH ACTIVE message and may note the event in a system history log before putting the notification appliance circuit 16 into ALARM MODE and sending an APPLIANCE ON message to the particular activated appliance at step 312. The microprocessor 126 receives the APPLIANCE ON message and operates the appropriate alarm indicator circuits 106, 108. After a test interval, the system controller sends an APPLIANCE OFF message to turn off the alarm indicator circuits.

In an alternate embodiment, the individual appliance testing process is modified to aid the technician in determining which appliances have been tested and which are yet to be tested. Accordingly, at the commencement of manual test mode, the system controller 14 sends a broadcast LED ON-PERIOD message to cause the appliances to operate the status indicator 120 at a specified periodic rate.

Upon a switch activation as described above with respect to steps 304, 306, 308 of FIG. 5, the operation of the individual status indicator at step 310 is modified to instead deactivate the status indicator, followed by the remaining steps 312 and 314. In this manner, a technician is able to distinguish untested appliances (blinking status indicator) from tested appliances (extinguished status indicator). Alternatively, the testing could begin with the status indicator off and each would be turned-on to indicate testing.

Equivalents

While this invention has been particularly shown and described with references to preferred embodiments thereof, it will be understood by those skilled in the art that various is changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of testing a building alarm system, the method comprising the steps of:

(a) providing plural notification appliances connected to a system controller, each notification appliance having a test status indicator for indicating notification appliance test status and an alarm indicator for indicating an alarm condition to building occupants;

(b) selecting at the system controller one or more notification appliances to operate; and (c) communicating from the system controller to each selected notification appliance an instruction to operate its associated test status indicator for verification without operating its associated alarm indicator so as to avoid disrupting the building occupants.

2. The method of claim 1 further comprising the step of providing a test alarm input to the system controller which is specific to one or more alarm condition detectors, and wherein step (b) comprises selecting which notification appliances to operate in response to the specific test alarm input.

3. The method of claim 1 further comprising, prior to steps (b) and (c), the steps of polling each of the notification appliances from the system controller and receiving an answer at the system controller in response to the polling step from any of the notification appliances, and wherein step (b) comprises selecting those notification appliances which answer the poll.

4. The method of claim 1 wherein step (c) comprises communicating the instruction to a group of addressable notification appliances using a group address.

5. An alarm system comprising:

plural notification appliances, each notification appliance having a test status indicator for indicating notification appliance test status and an alarm indicator for indicating an alarm condition to building occupants; and a system controller connected to the plural notification appliances, the system controller in a test mode selecting one or more notification appliances to operate and communicating to each selected notification appliance an instruction to operate its associated test status indicator for verification without operating its associated alarm indicator.

6. The system of claim 5 wherein the notification appliances are addressable and the system controller communicates the instruction to a group of addressable notification appliances using a group address.

7. The system of claim 5 wherein the system controller selects which notification appliances to operate in response to a test alarm input which is specific to one or more alarm condition detectors.

8. The system of claim 7 wherein the alarm indicator comprises an audible indicator and a flashing visible indicator and wherein the test status indicator of a selected notification appliance is operated in response to the test alarm input at different rates to indicate whether the audible indicator only, the flashing visible indicator only, or both audible and flashing visible indicators are intended to be operated.

9. The system of claim 5 wherein the system controller is operable to poll each of the notification appliances, each notification appliance is operable to send an answer to the system controller in response to the poll, and the system controller selects those notification appliances which answer the poll.

10. The system of claim 5 wherein the test status indicator comprises an LED indicator.

11. The system of claim 10 wherein the alarm indicator comprises an audible indicator.

12. The system of claim 10 wherein the alarm indicator comprises a flashing visible indicator.

13. The system of claim 10 wherein the alarm indicator comprises an audible indicator and a flashing visible indicator.

14. A method comprising the steps of:

providing plural notification appliances connected to a system controller, each notification appliance having an alarm indicator and a locally-activated test switch;

activating the locally-activated test switch of one of the plural notification appliances;

transmitting a first message from the one activated appliance in response to the test switch activation; and receiving the first message at the system controller and transmitting to the activated appliance a second message instructing the activated appliance to operate its associated alarm indicator for a test time interval.

15. The method of claim 14 wherein each notification appliance further includes a test status indicator and further including the step of operating the test status indicator of the activated appliance in response to the switch activation for a second test time interval.

16. The method of claim 14 wherein each notification appliance further includes a test status indicator and further including the steps of operating the test status indicators at a periodic rate and extinguishing the test status indicator of the activated appliance in response to the switch activation.

17. An alarm system, comprising:

plural notification appliances, each notification appliance having an alarm indicator and a locally-activated test switch, the appliance being programmed to transmit a first message in response to an activation of the test switch; and a system controller connected to the plural notification appliances, the system controller receiving the first message from the activated appliance and in response to the first message transmitting to the activated appliance a second message instructing the activated appliance to operate its associated alarm indicator for a test time interval.

18. The system of claim 17 wherein the locally-activated test switch is a magnetic-field sensitive switch.

19. The system of claim 17 wherein the locally-activated test switch includes an infrared sensitive switch.

20. The system of claim 17 wherein each notification appliance further includes a test status indicator and wherein the activated appliance is programmed to operate the test status indicator in response to the test switch activation for a second test time interval.

21. The system of claim 20 wherein the second message includes an instruction to operate the test status indicator of the activated appliance for a third test time interval.

22. The system of claim 20 wherein the test status indicator comprises an LED indicator.

23. The system of claim 17 wherein each notification appliance further includes a test status indicator and wherein the appliances are programmed to operate the test status indicator at a periodic rate and the activated appliance is further programmed to extinguish the test status indicator in response to the test switch activation.

24. The system of claim 17 wherein the alarm indicator comprises an audible indicator.

25. The system of claim 17 wherein the alarm indicator comprises a flashing visible indicator.

26. The system of claim 17 wherein the alarm indicator comprises an audible indicator and a flashing visible indicator.

*27. The alarm system of claim 5, at least one notification appliance comprising:*

*a selector which selects between a generated tone signal and an audio signal, the audio signal being provided to the notification appliance from a system controller; and*

*an audio transducer for broadcasting the selected signal.*

*28. The alarm system of claim 27, the audio signal being provided from the system controller by being superimposed on power/communication lines.*

*29. The alarm system of claim 27, wherein the notification appliance plays prerecorded announcements.*

*30. The method of claim 14, further comprising:*

*providing an audio signal from the system controller; and*

*in at least one notification appliance,*

*selecting between a generated tone signal and the audio signal, and*

*broadcasting the selected signal.*

*31. The method of claim 30, the audio signal being superimposed on power/communication lines.*

*32. The method of claim 30, further comprising playing, in said notification appliance, prerecorded announcements.*

* * * * *